May 4, 1937.   C. G. MUNTERS   2,079,419
REFRIGERATION
Filed April 2, 1934   4 Sheets-Sheet 1

INVENTOR
Carl Georg Munters
BY
his ATTORNEY

May 4, 1937. C. G. MUNTERS 2,079,419
REFRIGERATION
Filed April 2, 1934 4 Sheets-Sheet 2

INVENTOR
Carl Georg Munters
BY
his ATTORNEY

May 4, 1937.  C. G. MUNTERS  2,079,419
REFRIGERATION
Filed April 2, 1934    4 Sheets-Sheet 4

INVENTOR
Carl Georg Munters
BY
his ATTORNEY

Patented May 4, 1937

2,079,419

UNITED STATES PATENT OFFICE 2,079,419

REFRIGERATION

Carl Georg Munters, Stockholm, Sweden, assignor, by mesne assignments, to Servel, Inc., Dover, Del., a corporation of Delaware Application April 2, 1934, Serial No. 718,664
In Germany October 9, 1933

30 Claims. (Cl. 62—5)

This application is a continuation in part of my application Serial No. 701,123, filed Dec. 6, 1933, now Patent No. 2,027,057.

The invention relates to refrigerating systems of the kind having low pressure periods of refrigerant evaporation and absorption and incident production of low temperature, alternating with higher pressure periods of vapor expulsion from solution, and in which the absorption liquid is heated a little at a time during expulsion periods and the bulk of the absorption liquid is maintained in cold condition during the expulsion periods.

In absorption refrigeration apparatus of the periodic or intermittent type, heat is rejected from the condenser during expulsion periods whereas no heat of absorption is rejected during expulsion periods and heat is rejected from the absorber during absorption periods but not from the condenser during absorption periods. Particularly in an air-cooled apparatus, the rejection of heat requires considerable surface. One of the objects of the present invention is to provide an arrangement in refrigerating apparatus of the type above referred to in which the same heat transfer surface is used for the condenser and absorber. I propose to raise the absorber heat rejecting element relative to the generator and storage vessel for cold liquid toward the condenser until they meet in a common heat rejecting surface without, however, sacrificing efficiency of operation and particularly speed of change of periods. I also preferably lower the condenser so that the condenser and absorber have a suitable position in the system with respect to liquid columns.

Another object of the invention is to provide a novel and efficient control apparatus and mode of control and mode of operation in a system of the type above set forth.

Other objects and the nature and advantages of the invention will be apparent from the following description taken in conjunction with the accompanying drawings, forming a part of this specification, of which:

Figure 1:
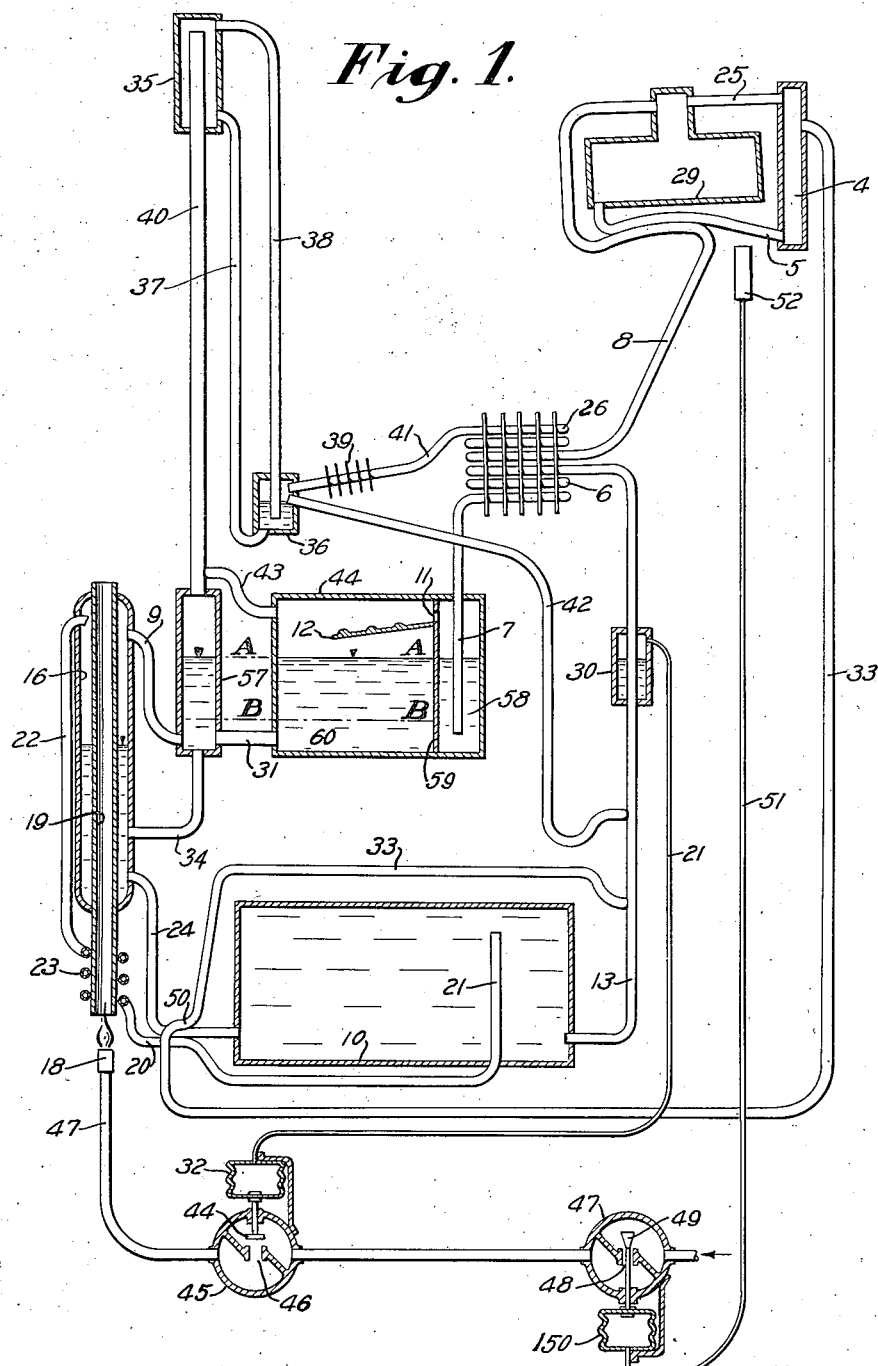
Fig. 1 is a diagrammatic showing of an apparatus in accordance with the invention.

Referring to Fig. 1, the system illustrated comprises a reservoir 10 for holding the bulk of absorption liquid in cold condition during expulsion periods, a generator or separator 16, a liquid heat exchanger 20, a condenser 26, an evaporator 29, a liquid column trap including a lower vessel 36, an upper vessel 35, and conduits 37, 38, a vapor liquid lift element 23, other parts to be hereinafter described, and conduits interconnecting all the various elements. Generally, the various vessels and conduits are made of metal such as steel and shaped to best withstand internal pressures, the conduits being generally round and the vessels cylindrical with rounded closed ends. All the parts are in open and unobstructed fluid communication with each other.

The reservoir 10 is situated at a relatively low part of the system and may be, as shown, a single vessel. This vessel is exposed to the cooling influence of atmospheric air.

The generator consists of a vertically disposed cylinder through which a vertical flue 19 passes. The generator is adapted to hold a relatively very small quantity of liquid compared to the quantity of liquid adapted to be contained in the reservoir or storage vessel 10. The volume of liquid adapted to be contained in the generator 16, and therefore the heat storage capacity thereof, is very small compared to generators heretofore proposed in intermittent apparatuses. The generator may be heated in any desired way, as by an electric heater, oil burner, steam jacket, gas flame or the like. I have shown a gas burner 18 directed into the heating flue 19.

A circuit for absorption solution is provided between the generator 16 and the reservoir 10 including a liquid heat exchanger 20. The heat exchanger may be of the coiled concentric type, i. e., comprising an inner tube extending concentrically through an outer tube, forming an annular space therebetween so that liquid may be conducted through the inner tube in good thermal exchange relation with liquid flowing in the annular space. It will be obvious that various forms of heat exchanger may be used. A pipe 21 opens into the upper part of vessel 10 and is coiled around the flue 19 to form a vapor liquid lift element or expeller 23, thence continuing upwardly as pipe 22 to the upper part of the generator 16. A pipe 24 extends from the lower part of the generator 16 in heat exchange relation with pipe 21 to form heat exchanger 20 and thence to the lower part of vessel 10. At least the portions 23 and 22 of conduit 21—22 are of sufficiently small diameter that gas and liquid cannot pass each other therein (disregarding a film of liquid on the wall of the conduit) wherefore vapor bubbles formed in the coil section 23 fill out the width of the conduit and exert a lifting action on the liquid therein to create an upward flow. These tube sections 23 and 22 comprise a vapor liquid lift. The reaction head on the vapor liquid lift is a column of liquid in the reservoir 10 and liquid containing structure extending upwardly therefrom, presently to be described. A vapor liquid lift of other kind, such as that shown in Lenning Patent No. 1,645,706, of October 18, 1927, may be used. The upper end of conduit 22 where it is connected to the generator 16 is preferably higher than the top of the reservoir 10. The generator 16, the vapor liquid lift, the liquid heat exchanger and a volume variation vessel presently to be described and interconnecting conduits are preferably thermally insulated to reduce heat losses.

Connected between the condenser 26 and the generator 16 is a liquid column trap arrangement comprising an upper vessel 35 and a lower vessel 36 interconnected by conduits 37 and 38. A conduit 9 connects the vapor space of generator 19 with the lower part of an analyzer vessel 57. The upper part of vessel 57 is connected by means of a vapor conduit 40 with the upperpart of vessel 35. A conduit 41 connects the upper part of the lower vessel 36 with the upper end of the condenser 26. Conduit 37 is connected at its upper end to the bottom of the upper vessel 35 and is looped downwardly below vessel 36 and connected to the bottom of the latter. The upper end of conduit 38 extends upwardly and is connected to the upper part of vessel 35 and is connected at its lower end to vessel 36 slightly above the opening of conduit 37. A conduit 8 connects the lower part of the condenser with the dome of the evaporator 29. The condenser is cooled by cooling fins 27 exposed to the cooling influence of atmospheric air.

A conduit 13 is connected to the lower part of reservoir 10 and extends upwardly and is connected to an absorption liquid cooling or heat rejecting element 6. The other end of the absorber or absorber cooling element 6 is connected by means of a pipe 7 to a chamber 58 within a volume variation vessel 44. A partition 59 divides vessel 44 into two chambers 58 and 60 communicating at the upper part through an aperture 11. Chamber 58 may be formed in a vessel separate from chamber 60. Just below opening 11 and in chamber 60 is a trough or baffle 12, which is inclined downwardly and over which liquid may flow from chamber 58 to chamber 60. Vessel 44 is connected at its lower part to the lower part of analyzer vessel 57 by means of a pipe 31. The upper part of vessel 44 is connected to conduit 40 by means of a pipe 43. A pipe 42 is connected to vessel 36 and to pipe 13. A pipe 34 connects the bottom of analyzer vessel 57 with the generator.

Evaporator 29 is connected to a tube 4 by means of a pipe 5 and a pipe 25. Pipe 5 has an upward bend adapted to trap gas therein and is in heat exchange relation with the pipe 8 or some other warm pipe of the system, for example, pipe 38. A pipe 33 opens into tube 4 at about the level of the lower part of the dome of the evaporator. This pipe extends downwardly and, as shown at 50, is in heat exchange relation with heat exchanger 20. This heat exchange is preferably at a relatively warm part of the heat exchanger. The pipe 33 continues from this point to and is connected with pipe 13.

Control mechanism is provided for the system as follows:

A jacket 30 containing a volatile fluid is in heat exchange relation with conduit 13 above the connection of conduit 42 therewith. This jacket or bulb is connected by means of the tube 51 with a bellows 32. The bellows is expansible and operates the valve member 44 adapted to open and close the opening 46 in a valve structure 45 mounted in a gas supply line 47 for conducting gas to the burner 18. In series with valve 45 is a valve 47 having an opening 48 controlled by a gradually opening and closing valve 49 which is actuated by a bellows 150. The bellows 150 is connected by means of a tube 51 with a thermostat bulb 52 situated within the space to be cooled. The bulb 52 likewise contains a volatile fluid.

The system is charged with a solution of refrigerant such as ammonia in an absorption liquid such as water which has preferably been purified by distillation. Obviously other refrigerants and absorbents may be used. Since the methods of charging absorption refrigerating apparatus are well known in the art, the charging connections and apparatus are not illustrated. The system is filled with water solution of ammonia of, for example, 28% concentration. The apparatus should be filled so that with liquid in the various parts at the same level, the surface is somewhat below the top of vessel 44, for example, just below the baffle 12. The volume variation chamber 60 should have a capacity such that it can take up the difference in solution volume of the different periods represented by the amount of refrigerant driven over into the evaporator or other accumulator during the heating period. The evaporator may be provided with extended surface or an indirect transfer system or loops or other means for transferring cold to the body to be cooled. Preferably the evaporator 29 is imbedded in insulation and loops or conduits or a secondary system used for extracting heat from the body to be cooled. The usual pilot light is provided in conjunction with the burner 18 so that the burner will be automatically lighted when gas is supplied.

The liquid levels shown in Fig. 1 represent a condition during the expulsion period.

In operation;

When the system is first put into operation, both valve operating thermostat bulbs are at substantially room temperature, wherefore both valves 45 and 47 are open and the burner and pilot are lighted by opening the usual line shutoff valve, not shown. The burner applies heat through the flue 19 to both the generator or separator vessel 16 and the vapor lift coil 23. Due to the small volume of liquid in the generator, the temperature thereof is rapidly raised to the point at which ammonia vapor distilled from the solution can be condensed in the condenser. The gas which is formed in the coil 23 makes the column of fluid therein considerably lighter than the liquid in other portions of the solution circuit wherefore absorption solution flows upwardly through conduit 22 into the generator 16. Solution flowing upwardly through conduits 23 and 22 is replaced through tube 21 from the upper part of the reservoir 10, while solution returns from the generator 16 through conduit 24 into the lower part of reservoir 10. The conduit 24 is not subjected to heat. Since ammonia vapor is distilled from solution both in the coil 23 and in the generator 16, the solution returning from the generator to the reservoir 10 is of low ammonia concentration and is referred to as weak solution or weak absorption liquid or liquor.

At the beginning of the vapor expulsion period, the amount of liquid contained in the generator 16 and the coil 23 (which is also a generator or expeller) is first heated. This is but a small part of the total amount of solution contained in the system. After vapor is expelled from this part of the solution, more solution is fed to the heated zone due to the lifting effect of the vapor lift. Thus the solution is heated a little at a time to vapor expulsion temperature. As soon as vapor is expelled from any part of the solution, the resulting weak solution is conducted away from the heated zone, through conduit 24, and is immediately cooled. This active cooling during the expulsion period is accomplished by the cold rich solution passing to the vapor lift 23. The arrangement of parts is such that although cold liquid is held above the heated zone in reservoir 10 and conduits 7 and 13 and absorber element 6, vapor will not pass thereinto through the heat exchanger. Vapor will also not pass to the cold liquid through chamber 60 on account of maintenance of stagnant liquid in chamber 58. The heat exchanger should be amply long to cool the weak absorption liquid to approximately the temperature of the rich solution leaving reservoir 10. The cooled weak solution enters the reservoir 10 through conduit 24 and is stored in reservoir 10 awaiting the initiation of the absorption period.

The ammonia vapor expelled from solution in the coil 3 and in the generator and separator vessel 16 passes through conduit 9 and bubbles through liquid in analyzer vessel 57 and passes upwardly through conduit 40 and through conduit 38 and conduit 41 to the condenser 26. A rectifier 39 may be interposed in conduit 41 by adding air cooling fins thereto. The rectifier is in a portion of the pipe 41 sloping backwardly to vessel 36.

In the condenser, ammonia vapor is condensed to liquid and the liquid passes through conduit 8 due to the pressure developed in the generator and enters the evaporator 29. Due to the high pressure in the system during this expulsion period, the liquid ammonia merely accumulates in the evaporator 29. Due to distillation of ammonia in the coil 23 and generator 16, the liquid level or surface drops in chamber 60, chamber 58, vessel 57, and conduit 42. The latter serves as an overflow for excess liquid from vessel 36 back to the liquid circuit. Since pipe 42 is small in diameter and contains liquid it will not permit flow of vapor into the cold liquid therethrough. The upper part of this pipe may, if desired, be insulated so that it will not act as a condenser, but in view of its small surface this is not necessary as no appreciable condensation will take place therein.

During this expulsion or heating period, air cools reservoir 10. This reservoir may also be equipped with cooling flanges, though this is not necessary. During this period the liquid is stagnant in the absorber 6 and is at the temperature of the outside air. This may be approximately 80° F. while the temperature in the generator is rising to over 300° F., wherefore the temperature of the generator is more than 200° F. higher than the temperature in the reservoir 10 during the expulsion period. The liquid in reservoir 10 is therefore maintained during the heating period at such a temperature as to be immediately available for absorbing refrigerant vapor upon decrease of pressure in the system, and, as previously set forth, the heat storage capacity of the generator being relatively very small, the cooling thereof to produce reduction in pressure may be accomplished very rapidly as hereinafter described. The ratio of liquid volume in the generator to that in reservoir 10 may be 1 to 10 or more. This ratio of course is in nowise critical but merely indicative of the large volume of cold solution immediately available for absorption compared to the small volume of hot solution to be cooled upon instigation of the absorption or refrigeration period.

During the expulsion period, a small continuous stream of cool rich solution flows from the reservoir through the heat exchanger 20 in counterflow to and in thermal heat exchange relation with a return stream of hot weak solution flowing from the generator to the reservoir. Due to the transfer of heat from the hot weak solution to the cool rich solution in the liquid heat exchanger, a certain amount of heat input is conserved or recaptured to raise the temperature of the rich solution toward the generator temperature and prevent dissipation of heat in the absorber or reservoir.

The vessel 44 is separate from the absorber and from the generator and provides a space separate from these vessels for taking care of the liquid volume variation of the absorption liquid so that neither the absorber nor the generator has to carry out this function. Vessel 44 acts as a closure in the line of communication between the generator and the part of the apparatus containing cold liquid during the expulsion period. It contains a stagnant surface layer of absorption liquid at a different temperature than the temperature of the absorber-reservoir itself, or that part of the absorption liquid which is exposed to the external cooling source, so that it is possible to obtain stagnation of liquid surface and prevent any appreciable condensation and absorption of refrigerant vapor during the vapor expulsion period without adversely affecting the absorption operation when the absorption period begins, while at the same time segregating the variation of volume of absorption liquid from the expeller and permitting a part of the cold liquid containing portion of the apparatus to be at a higher level relative to the expeller and the gas space immediately thereabove. This stagnation of liquid at or above condensation temperature in vessel 44 is in addition to the prevention of access of vapor to the cold liquid afforded by the narrow character of pipe 42.

From the above it will be apparent that, during the expulsion period, the solution is segregated into three principal parts, of which one part is the main body and is maintained cool or actively cooled; another part of very small volume is heated to produce the refrigerant vapor, and a surface layer of liquid is maintained at a temperature at or above the temperature of the condenser. We may go further and say that the solution is divided into four principal parts, namely, the three parts identified as aforesaid, and also the part which is in the heat exchanger.

During this period there is a liquid column between condenser 26 and evaporator 29. Consequently liquid is pressed upwardly in the pipe 33 above the levels in chambers 57 and 60 by an amount equal to the head of the liquid column between the condenser and the evaporator (disregarding the small head in vessel 36). The lower the condenser is placed relative to the evaporator, the higher will be the column of liquid in pipe 33 above the level in chamber 60, other conditions remaining constant. Consequently, the condenser should not be placed so low that liquid is pressed up through conduit 33 into the evaporator.

During the heating or expulsion period, ammonia vapor is condensed in the condenser 26 and accumulates in the evaporator 29. When the level has risen to a given height in the evaporator, some liquid overflows into conduit 33. The first liquid to overflow into this conduit is absorption liquid accumulating in the bottom of the evaporator. So long as absorption liquid flows through conduit 33, there will be no effect on the system on account thereof. When, however, liquid ammonia flows through this conduit, it will be vaporized due to its lower boiling point at the place 50 where conduit 33 is in heat transfer relation with the heat exchanger. This causes formation of vapor in conduit 33 which vapor passes upwardly therein and into conduit 13. The vapor entering conduit 13 starts a liquid circulation upwardly therein. The cold liquid absorbs the vapor and heat of absorption is rejected. This heat warms up bulb 30 and causes expansion of fluid therein, as a result of which bellows 32 is expanded and valve member 44 closes the valve 45, thus shutting off the supply of heat to the generator and vapor lift coil. No control of the cooling facility is necessary. As previously set forth, the generator and vapor lift are constructed to have such a small heat storage capacity that cooling thereof occurs rapidly. The admission of vapor into conduit 13 causes flow of liquid upwardly therein and thus cold liquid passes into chamber 58 and rises upwardly therein and flows through opening 11 and downwardly on baffle 12 into the chamber 60. The supply of cold weak absorption liquid into the gas space above liquid in the warm part of the apparatus causes absorption of ammonia vapor. The gas space in chamber 60 is connected by means of conduit 43 to conduit 40 so that gas is removed from this conduit by absorption. The cooling of the generator and the supply of absorption liquid to the gas space and the breaking up of the stagnant liquid film causes a rapid reduction in pressure. The reduction in pressure in the vapor space in the generator and parts connected directly therewith causes liquid to be pulled upwardly in conduits 37 and 38, thus forming a liquid column for maintaining a pressure differential. If the reduction in pressure is too rapid, liquid may surge upwardly through conduits 37 and 38, thus breaking the seal, but this condition is compensated for by the loop in conduit 37. Liquid will flow downwardly through this loop to maintain the liquid seal between the evaporator and generator.

As the liquid rises in conduits 37 and 38, it is pulled down in conduit 42 due to liquid communication through the generator. The columns of liquid continue to build up until the liquid level in conduit 42 falls to the opening of this conduit in the rising conduit 13 between reservoir 10 and absorber 6.

Due to the lowering of liquid in conduit 42 and the rise of liquid in conduits 37 and 38, a gas path is formed between the evaporator and conduit 13 through pipes 8, 41 and 42. The pressure in this path is higher than the pressure in conduit 40 due to the liquid column in pipes 37 and 38. The low pressure in the vapor space between the liquid column and the generator produced by the absorption of ammonia vapor by cold liquid acts through the absorption liquid containing parts to create a slightly lower pressure in conduit 13 at the point of connection of conduit 42 thereto than in the gas path between the evaporator and conduit 13. Evaporation now takes place in the evaporator, the heat of vaporization being supplied by the liquid ammonia whereby the temperature thereof is reduced below that of the surrounding medium and transfer of heat from the latter to the evaporator takes place, thus producing refrigerating effect. The ammonia vapor introduced from conduit 42 into conduit 13 decreases the specific weight of the column in the latter, thereby producing an upward flow of solution. Conduit 13 is of such small diameter that vapor cannot readily pass the liquid therein whereby the vapor exerts a lifting effect on the liquid, the same as in the vapor lift element 23, 22. The upward flow of solution in conduit 13 creates circulation of solution through the absorption period circuit, which, in the apparatus shown, is upwardly through conduit 13, through the absorber 6 where vapors are absorbed and heat is rejected, downwardly into chamber 58, over the tray 12, through chamber 60, through conduit 31 into vessel 57, through conduit 34, through the generator 16, and through conduit 24 back to the reservoir 10.

Inasmuch as the evaporator has fallen in temperature to a very low value, for example, —20° F., bulb 52 has been cooled to such an extent that valve 47 has closed. This valve may be set to close below 20° F. When the temperature rises to above, for example, 20° F., valve 47 opens. In the meanwhile, valve 45 will have opened if suitably adjusted. If it has not already opened it will open as soon as the vapor supply to conduit 13 is reduced to such an extent that bulb 30 can cool off to a value at which the valve will open.

When gas is re-admitted to the burner 18, the pressure rises in the generator and in conduit 40 and the liquid column in pipes 37 and 38 falls down and gas communication is established between the generator and the condenser through the analyzer 57, and the circulation stops through the local absorption circuit including absorber 6, and the expulsion period sets in again as previously described. Should the temperature of the body to be cooled be low when valve 47 comes into operation to admit gas to the generator this valve may restrict the supply of gas and thus act as a regulator of temperature for the body to be cooled. This slows up the generation of ammonia vapor and the expulsion period is thus prolonged in accordance with the low temperature of the space to be cooled. If, on the other hand, the space to be cooled is at a relatively high temperature, the valve 47 will open wide and thus the expulsion period is shortened to as fast a period as is permitted by the apparatus. Thus this control both regulates the cycle operation and serves to maintain the desired temperature of the space to be cooled within predetermined limits.

By providing a local absorption liquid circuit for absorption periods, which does not have flow therein during expulsion periods, it is possible to utilize the same fins or cooling surface for the condensation of refrigerant vapor during expulsion periods, and rejecting heat of absorption during absorption periods.

By providing an absorption liquid circuit including an upflow conduit (13) and a downflow conduit (7) connected at a high elevation, it is possible to provide a low pressure space to which vapor can be supplied without creating a large driving force. The liquid in the absorber is at a lower pressure than liquid in chamber 60, or the generator, or the storage reservoir.

By starting circulation of cold absorption liquid before the heating period is ended, and circulating the cold absorption liquid into the presence of vapor above the hot residual liquid in the warm part of the system, the pressure can quickly be brought down to cause evaporation sufficient to produce refrigeration and a pressure differential quickly created for forcing refrigerant gas into absorption liquid.

By starting circulation of cold absorption liquid before the heating period is ended, and utilizing the circulation to shut off the heat, a positive control can be obtained which is independent of outside temperatures and guarantees complete distillation during the heating period.

Figure 2:
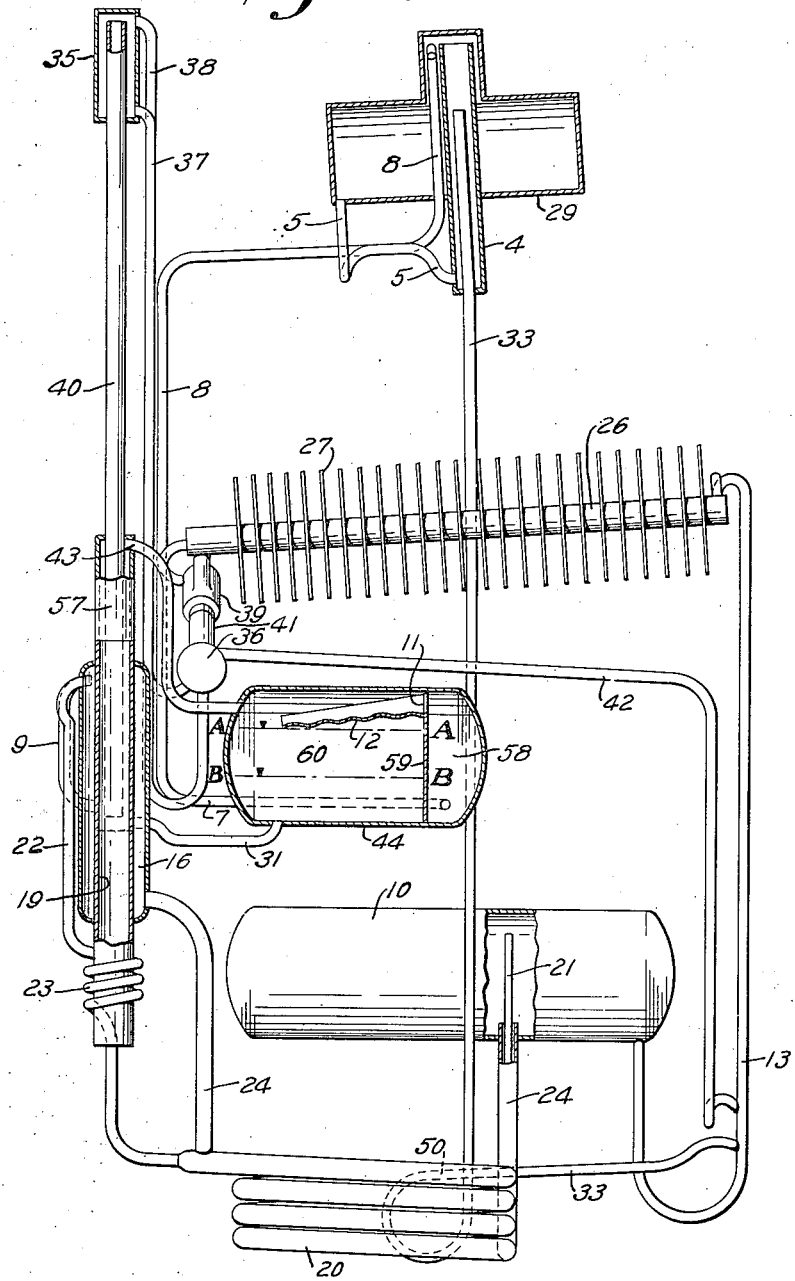
Fig. 2 is an elevational view, partly in cross section, of an apparatus embodying the invention.
Figure 3:
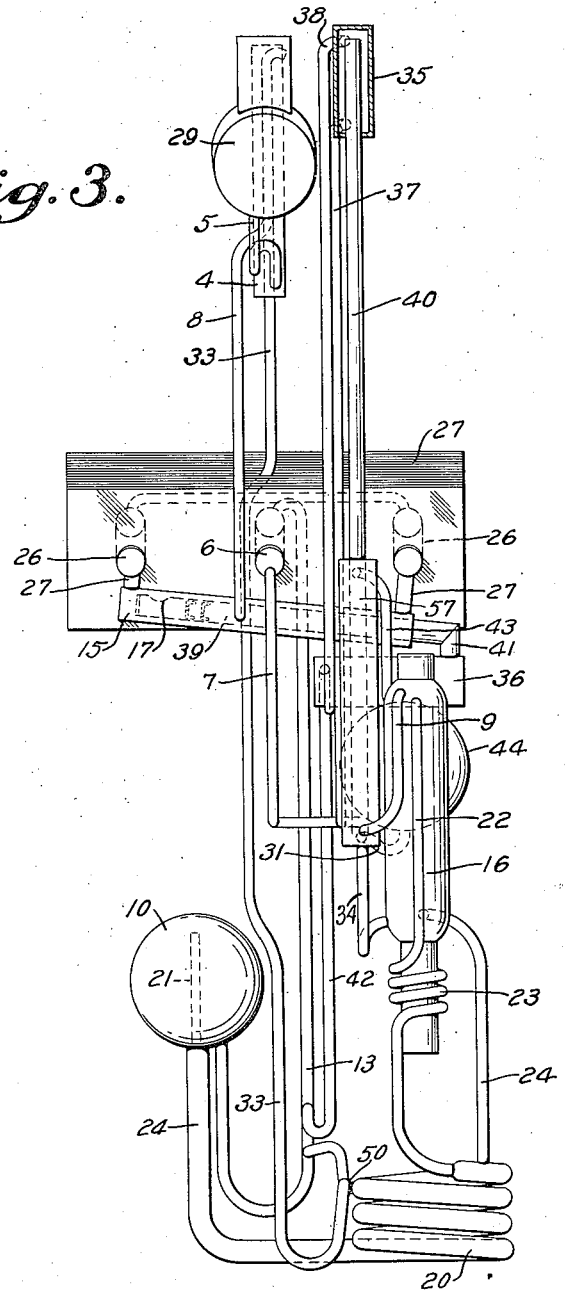
Fig. 3 is a side view, partly in cross section, of the apparatus shown in Fig. 2.

Figs. 2 and 3 disclose an actual apparatus embodying the invention. Like reference characters designate like parts in Figs. 1, 2 and 3. The generator consists of a cylindrical vessel surrounding a flue 19, around which is also wrapped a vapor lift coil 23. A conduit 22 extends upwardly from coil 23 to the upper part of the generator. Conduit 21 extends from within reservoir 10 through conduit 24 to form heat exchanger 20 and thence to the coil 23. Conduit 24 is connected to the lower part of the generator and extends outside conduit 21. Conduit 13 extends downwardly from the bottom of reservoir 10 and then upwardly to connect with an absorber element which is the central tube of three imbedded in fins 27. A conduit 7 extends downwardly from absorber member 6 and is connected to the bottom of chamber 58 formed within vessel 44. Vessel 44 is divided into the two chambers 60 and 58 by the partition 59 having an aperture 11 therein. A tray 12 is also provided as in Fig. 1. The lower part of chamber 60 is connected with the bottom of analyzer 57 by means of conduit 31. The bottom of analyzer 57 is connected with the lower part of the generator by means of conduit 34. The upper part of chamber 60 is connected with the upper part of vessel 57 by means of conduit 43. Tube 40 extends downwardly within vessel 57 and has an aperture communicating with the gas space thereof wherefore the effective relation and connection of parts is the same as in Fig. 1. The upper part of the generator is connected with the bottom of vessel 57 by conduit 9. The same liquid column means is provided by conduits 37 and 38 and chambers 35 and 36.

A conduit 41 connects chamber 36 with a rectifier 39. This rectifier is formed by extending conduit 41 upwardly within an outer conduit 15. These conduits are inclined so that liquid therein flows backwardly toward vessel 36. Conduit 40 within conduit 15 is provided with apertured discs and has a hole 17 at the upper end whereby ammonia vapor can enter conduit 15 and then pass through pipes 27 to the condenser tubes 26 which are imbedded in the air cooled fins 27 to each side of the absorber member 6. Condensate formed in the condenser 26 flows backwardly and forms a pool around the part of conduit 41 which is within conduit 15, this pool acting to condense water vapor within conduit 41 and thus rectify the vapors passing to the condenser. A conduit 8 is connected to the space between conduits 41 and 15 and extends upwardly to the evaporator 29. Within the evaporator is a tube 4 closed at the bottom and open within the dome of the evaporator and connected to the lower part of the evaporator by a conduit 5. An overflow or drain conduit 33 extends upwardly within tube 4 and extends downwardly into heat exchange relation with a warmer part of the heat exchanger 20 at 50. Thence the conduit continues and is connected to conduit 13. Conduit 42 is connected between vessel 36 and conduit 13.

The operation of this apparatus will be apparent from consideration of the foregoing description of Fig. 1.

With respect to the regulation above described, a snap mechanism may be employed interconnecting the valves so that valve 45, when shut, remains shut until valve 47 shuts; the shutting of valve 47 allowing 45 to open due to cooling of bulb 30. In such case bulb 52 is preferably in direct contact with the evaporator. The system may be regulated in any of the various manners described in my application Ser. No. 718,136, filed on or about March 30, 1934.

Figure 4:
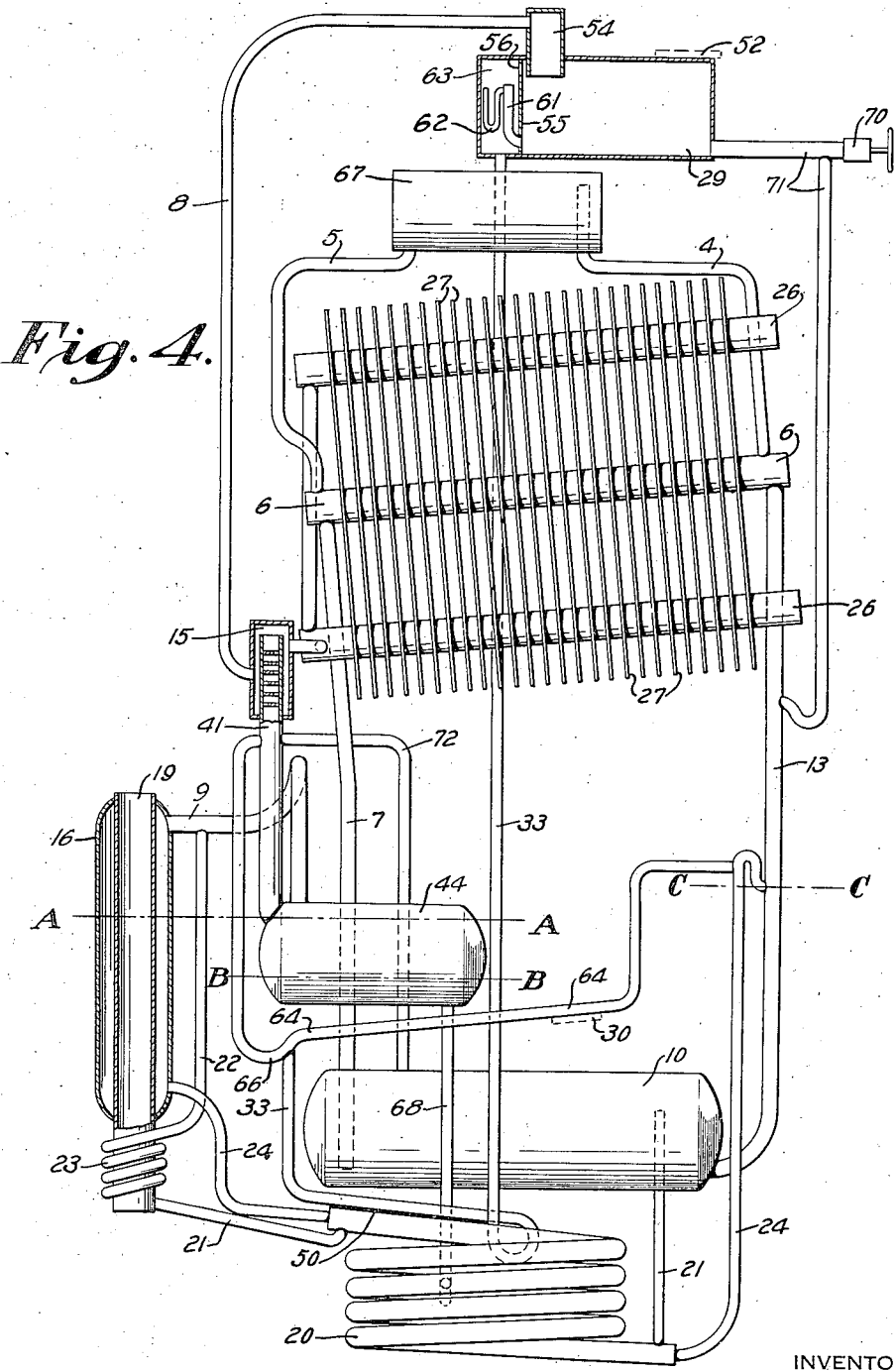
Fig. 4 is an elevational view, partly in cross section, of another apparatus embodying the invention.

Another system embodying the invention is shown in Fig. 4. Like parts with respect to the previous embodiment are designated by like reference characters. This system comprises a generator or expeller 16 having a central heating flue 19. Wound around flue 19 to receive heat from the heat supply is a vapor lift coil 23, which is preferably of such width that gas bubbles fill out the cross-section thereof. A riser 22 is connected to receive liquid and vapor from coil 23 and discharge into expeller 16. It will be understood that coil 23 is also an expeller. Pipe 22 may, as shown, be connected to a vapor conduit 9 connecting the upper part of vessel 16 with the upper part of a volume variation vessel 44. Conduit 9 is so shaped that liquid discharged therefrom conduit 22 flows into generator 16.

A conduit 41 is connected to the top of volume variation vessel 44 and extends upwardly within a conduit 15 forming a rectifier adapted to retain a pool of liquid in the lower part of member 15 around conduit 41 and having baffles within conduit 41. Communicating with the rectifier are two condenser pipes 26 having cooling flanges 27 in common. A conduit 8 is connected to the space of the rectifier adapted to hold the pool and extends upwardly and is connected to the dome 54 of an evaporator 29. The evaporator is subdivided into two compartments by means of a wall 55 having an aperture 56 at the upper part, the smaller compartment 63 containing a draining trap 61, 62.

A conduit 33 is connected to the bottom of compartment 63 and extends downwardly therefrom and is in heat transmitting contact with the warm end of liquid heat exchanger 20 at 50. Conduit 33 extends upwardly from the contact at 50 and is connected to a conduit 64. Conduit 64 connects the upper part of conduit 41 with a conduit 24 and is bent to form a trap 66 located below the bottom level of the volume variation vessel 44.

An absorption liquid reservoir 10 is connected by means of a conduit 21, formed in part by the outer space of heat exchanger 20, with coil 23.

Conduit 24 is connected to the lower part of generator 16 and to a conduit 13 and forms the inner pipe of heat exchanger 20. Conduit 24 is formed with an inverted bend or gas trap where it connects with conduit 13. Conduit 13 is connected to the lower part of reservoir 10. Conduit 13 extends upwardly and is connected to an absorber 6 arranged centrally between the condenser tubes 26 and imbedded in cooling flanges or fins 27 in common with the condenser tubes. A conduit 7 connects the lower end of absorber element 6 with the bottom of the absorption liquid reservoir 10.

An auxiliary vessel 67 adapted to have variation of liquid volume therein, and which may be termed an excess vapor vessel or regulating vessel, is connected to absorber 6 by two conduits 4 and 5. An equalizing connection 72 unites the upper part of pipe 41 with the top of reservoir 10. A drain connection 68 extends from the bottom of volume variation vessel 44 into the outer tube of the liquid heat exchanger 20, affording a passage for liquid from vessel 44 via conduit 21 to the coil 23 and generator 16. A drain 71 controlled by a hand valve 70 connects the lower part of evaporator 29 with conduit 13. Valve 70 is normally closed.

The apparatus is filled to approximately the level A—A with a solution of refrigerant in absorption liquid, such as ammonia in water, this level corresponding to the approximate level in the volume variation vessel 44 at the end of an absorption period. In addition to this charge there should be a further amount of solution charged into the apparatus equivalent to the volume of the absorber 6 and vessel 67 and the conduits connecting them with the lower part of the apparatus. Vessels 6 and 67 will normally be filled with liquid at the conclusion of an absorption period. The apparatus can be charged by means of a charging plug attached to any part of the system.

The generator, the volume variation vessel and the liquid heat exchanger are enclosed by insulation. Vessel 10 is exposed to atmosphere. The apparatus may be provided with control means as shown in Fig. 1, bulb 30 being in contact with pipe 64, and bulb 52 being in contact or heat temperature responsive relationship with evaporator 29, or the system may be controlled as described in my aforesaid copending application.

The operation of this apparatus is as follows:

Application of heat to the generator 16 causes expulsion of vapor from the generator contents. The vapor passes through conduit 9 into the volume variation vessel 44 where it is cooled down to some extent, the heat being given off to vessel 44 and its contents. Thence the vapor passes upwardly through pipe 41 and through the rectifier baffles where final rectification takes place. The vapor then passes into condenser pipes 26 which are connected to the rectifier jacket 15. Due to the generation of vapor, the pressure in the system will rise until the prevailing temperature of the condenser permits vapor to condense in the pipes 26. Condensate will then flow by gravity from the condenser pipes back into the rectifier jacket in which some of this condensate will again be boiled off due to the action of the rectifier, to condense again in the condenser pipes. The condensate will accumulate in the rectifier jacket up to the level where conduit 8 enters the same, and can rise no higher, since any excess quantity supplied to the jacket will be elevated through pipe 8 into the evaporator. Due to the rise in pressure caused by the action of the generator, the absorber element 6, although located at a higher level than the generator, will be entirely filled with liquid from the vessel 10 through pipes 7 and 13. The same will be true of vessel 67 which communicates with the absorber element 6 by means of conduits 4 and 5. Due to the action of the vapor lift 23, 22, there will be set up between the generator and the absorption liquid storage vessel 10 a liquid circulation through the heat exchanger 20 in a similar manner as has been already described in conjunction with other apparatuses embodying the invention. It will be seen that the weak solution returning from the generator through conduit 24 will return to the absorption liquid reservoir 10 by way of riser 13.

The volume variation or differential of the solution will, during the course of the expulsion period, locate itself in the volume variation vessel 44 in which the liquid level will drop to that designated by the level B—B. The differential liquid volume will, during this period, find its way from vessel 44 into the generator through conduit 68 which connects the bottom part of volume variation vessel 44 with the outer pipe of the heat exchanger 20 which is connected to the vapor lift 23. The free liquid level in the equalizing connection 72 will be approximately the same as that prevailing in vessel 44. The same will also be true for the free liquid level in that part of conduit 64 which is situated between trap 66 and conduit 41. During the expulsion period, the evaporator 29 will gradually be filled with liquefied ammonia. When this liquefied ammonia has reached a level near the top of the evaporator, the trap 61, 62 will spill over a portion of the bottom stratum of the evaporator contents into chamber 63 whence it will flow by gravity down through conduit 33 into trap 66 of conduit 64. In its passage through conduit 33, this liquid will be exposed to heat emanating from the heat exchanger 20, since conduit 33 is soldered or welded at its lower end to a suitably warm portion of the liquid heat exchanger. As long as the liquid coming from chamber 63 has a substantial water content, no gasification thereof will take place on its passage past the warm portion of the heat exchanger. However, when the water containing stratum of the evaporator has been drained off, so that essentially pure liquid ammonia is brought into the warm locality described, it will be gasified due to the influence of heat from the liquid heat exchanger. The vapor thus formed passes into conduit 64 causing a syphoning action which will elevate all liquid in conduit 64 into riser 13. This affords a direct gas communication between vapor conduit 41 and riser 13. There is now a rapid flow of vapor from the vapor producing part of the system through this gas communication into riser 13, the driving head causing this flow being a liquid column equal to the vertical distance between levels C—C and B—B. Part of the vapor from the evaporator may also find its way into conduit 64 through conduit 33. The hot vapor coming from the generator and passing through conduit 64 will cause thermostat bulb 30, which is in thermal connection with conduit 64, to be heated whereby bellows 32 (Fig. 1) is expanded to close valve 45 thereby causing an interruption of the heat supply to the generator. Vapor flowing through conduit 64 into riser 13 continues, however, first because the generator will still give off an appreciable quantity of vapor due to its relatively high temperature, and second because vapors emanating from the evaporator will be free to pass downwardly through conduit 8, through the rectifier jacket 15, through conduit 41 and into conduit 64 under the influence of the driving column, namely the vertical liquid height between levels C—C and B—B. The pressure in the system now rapidly drops since the vapor entering riser 13, whether it comes from the generator or from the evaporator, is readily absorbed. It will be seen that the generator and the evaporator are at the same vapor pressure and that there is no liquid column interposed between the generator and the evaporator.

The absorption period is now under way. The vapor entering riser 13 sets up a rapid liquid circulation in the liquid circuit including conduit 13, absorber element 6, conduit 7, and absorption liquid reservoir 10 due to the gas lift action in riser 13. Absorption takes place not only in riser 13 but also in the absorber element 6 where the heat of absorption is rejected by aid of the flanges 27 to the atmosphere. Since the rate of gas flow from the evaporator into the absorbing circuit is determined solely by the aforementioned liquid column C—C minus B—B and the gas resistance in the vapor connection from the evaporator to riser 13, the rate of vapor flow from the evaporator may occasionally be greater than what corresponds to the heat rejecting capacity of the absorbing portion of the system under prevailing conditions. If such is the case, there will occur an accumulation of unabsorbed vapor in the top portion of the absorber element 6 which would render the absorber element 6 partly ineffective were it not for the action of the auxiliary vessel 67.

Unabsorbed vapor in element 6 passes upwardly through connection 4 into vessel 67 where it accumulates at the top, thereby causing an equal amount of absorption liquid to be discharged through conduit 5, element 6, connection 7, reservoir 10, conduit 21, and connection 68 into the liquid volume variation vessel 44 where it causes a rise of the level represented by B—B. This rise of level B—B in turn causes a reduction of the driving column C—C minus B—B so that the rate of vapor flow into riser conduit 13 is hereby diminished. The absorber element 6 can be connected in reverse manner to conduits 7 and 13 so that vapor entering the absorber element through conduit 13 will travel upwardly along the entire length of the element before reaching conduit 4. Such an arrangement will further enhance the rate of absorption in element 6.

During the absorption period, the volume of ammonia solution in the apparatus will increase, so that the liquid level in vessel 44 will have a tendency to rise. Such rise will cause a reduction in the aforementioned driving column, so that the vapor flow through conduit 64 will be further reduced, causing the flow of vapor through conduit 4 to cease. Absorption in the liquid surface in vessel 67 will then cause absorption liquid to be withdrawn from the circulation system into vessel 67, so that the level in the volume variation vessel 44 automatically produces at all times a driving column closely corresponding to the capacity of absorption in riser 13 and absorber 6. The same regulation will take place on production of vapor in vessel 67 or absorber element 6 due to lowering of pressure. If the apparatus is correctly charged, the vessel 67 will be completely filled with ammonia solution towards the end of the absorption period. Thus the apparatus stabilizes itself by automatically distributing the volume differential between the main volume variation vessel 44 and the auxiliary vessel 67 during the absorption period.

The apparatus is operable even without the heat exchange relation between drain conduit 33 and heat exchanger 28. When, due to continued expulsion, the level B—B has dropped down into connection 68 to the neighborhood of the bottom of trap 66, this trap will be blown through by means of vapor from the generator, whereafter the absorption period will proceed identically as has heretofore been described. This mode of operation will, however, require a very accurate charging of the apparatus, since a continued drainage of liquid from the evaporator will prevent level B—B from dropping under a certain level.

When, at the end of the absorption period, the evaporator is empty of evaporable contents there will naturally be no more vapor flow through conduit 64, so that, due to the absorption of vapor at the point of entrance of conduit 60 into riser 13, absorption liquid will flow into pipe 66 and again fill up the trap 66 making the apparatus ready for another expulsion period. At this time the thermostatic bulb 52, attached to the evaporator, will have risen in temperature, so that valve 47 (Fig. 1) will again be opened. It is not necessary that the evaporator be completely discharged since, if the heat is turned on before evaporation stops, due to rise of the bulb 52 to a predetermined value, the element 28 will lift liquid in conduit 22 and raise liquid in the generator so that liquid will rise in conduit 28 and flow into conduit 64 to stop flow of vapor therethrough.

The action of the draining arrangement in chamber 63 adjoining the evaporator is as follows:

When a portion of refrigerant and entrained water, followed by an amount of pure refrigerant has been spilled over into conduit 33 and caused the absorption period to start, as previously described, it is important that the draining arrangement be such that no large excess of liquid refrigerant is drained out through this passage. For this reason the trap 61, 62 is so constructed that the diameter of tube 61 is considerably larger than that of trap of U-tube 62. The pressure drop in the system which accompanies the starting of the absorption period causes ebullition of the liquid refrigerant contained in tube 61 and it is for the purpose of preventing a syphoning action through tube 61 caused by such ebullition that the diameter of tube 61 is chosen relatively large. There will then form in the upper part of tube 61 a gas plug which will prevent any excess of refrigerant from passing through the trap element 62 into the chamber 63.

The drain cock 70 serves to quickly drain the evaporator of entrained solution in connection with the first starting of the apparatus after shipment in case the apparatus has been turned over or if the evaporator has been filled with ammonia solution. This drain cock has been introduced more for convenience than by necessity since the automatic drain arrangement described will produce the same effect in a few cycles. The evaporator can also obviously be drained by tilting the apparatus at a suitable angle toward the left in the figure.

It will be obvious that various departures may be made from the construction disclosed in carrying out the invention.

What I claim is:

1. In a refrigeration system containing refrigerant and absorption liquid and having low pressure periods of refrigerant evaporation and absorption alternating with higher pressure periods of vapor expulsion, the improvement which consists in providing separate spaces for storage of cooled absorption liquid, for expelling refrigerant from absorption liquid, for variation of solution volume, and for external cooling of absorption liquid, circulating absorption liquid through the expulsion space and the storage space but not the volume variation space nor the external cooling space during the higher pressure period, and circulating the absorption liquid through the storage space and the external cooling space during the low pressure period.

2. In an absorption refrigeration system operating with alternate periods of expulsion and absorption of refrigerant vapor, a generator, a first absorption liquid vessel, a second absorption liquid vessel, an absorption liquid cooling element, means to circulate absorption liquid between said first vessel and said generator while maintaining stagnant condition in said cooling element during the expulsion period, and means to circulate liquid through said first vessel, said second vessel and said cooling element during the absorption period.

3. In an absorption refrigeration system operating with alternate periods of expulsion and absorption of refrigerant vapor, a generator, a first absorption liquid vessel, a second absorption liquid vessel, an air cooled absorption liquid cooling element, means to circulate absorption liquid between said first vessel and said generator while maintaining stagnant condition in said cooling element during the expulsion period, and means to circulate liquid through said first vessel, said second vessel and said cooling element during the absorption period.

4. In an absorption refrigeration system operating with alternate periods of expulsion and absorption of refrigerant vapor, a generator, a first absorption liquid vessel, a second absorption liquid vessel, an absorption liquid cooling element, gas-lift means to circulate absorption liquid between said first vessel and said generator while maintaining stagnant condition in said cooling element during the expulsion period, and gas-lift means to circulate liquid through said first vessel, said second vessel and said cooling element during the absorption period.

5. In an absorption refrigeration system operating with alternate periods of expulsion and absorption of refrigerant vapor, a generator, a first absorption liquid vessel, a second absorption liquid vessel, an absorption liquid cooling element, means to circulate absorption liquid between said first vessel and said generator while maintaining stagnant condition in said cooling element during the expulsion period, and means to circulate liquid through said first vessel, said second vessel, said generator and said cooling element during the absorption period.

6. In an absorption refrigeration system operating with alternate periods of expulsion and absoption of refrigerant vapor, a generator, a first absorption liquid vessel adapted to hold the bulk of absorption liquid cool during expulsion periods, means to circulate liquid between said generator and said first vessel, an analyzer vessel, a second absorption liquid vessel, means to conduct liquid from said second vessel to said analyzer vessel, means to conduct liquid from said analyzer vessel to said generator, and means to conduct vapor from said generator to said analyzer vessel.

7. In an absorption refrigeration system having low pressure periods of refrigerant evaporation and absorption alternating with higher pressure periods of vapor expulsion without evaporation, an evaporator, an absorption liquid circuit, conduits connecting said evaporator with said circuit, means to heat a part of said circuit, means for overflow of liquid from said evaporator, means to heat the overflow liquid to form vapor, and heat responsive means actuated by vaporization of overflow liquid refrigerant from said evaporator to control said heating means.

8. In combination, an intermittent heat operated refrigerating apparatus comprising an evaporator and a drain conduit for automatically draining fluid from the evaporator, means for supplying heat to said apparatus, a thermostatic device having a sensitive element associated with said drain conduit and operatively connected to said heat supply means for restricting the heat supply to the apparatus in response to a change of phase of fluid in a portion of said drain conduit caused by the automatic drainage of fluid from the evaporator therethrough, and means to automatically restore the heat supply.

9. In the method of operating an absorption refrigeration system of the kind having periods of evaporation at low pressure alternating with periods of vapor expulsion at higher pressure, the improvement which consists in periodically expelling refrigerant from solution by application of heat, alternately therewith absorbing refrigerant into solution with rejection of heat, and automatically controlling the supply of heat in response to variations of temperature due entirely to conditions outside the generator and due to change of state of refrigerant from liquid to vapor to initiate both low pressure and higher pressure periods.

10. The method of controlling the application of heat to a refrigerating system of the kind having low pressure periods of refrigerant absorption alternating with higher pressure periods of vapor expulsion which comprises automatically decreasing heat supply to initiate the absorption periods due to quantity and quality of liquid in the evaporation portion of the system and automatically increasing the heat supply to initiate the expulsion periods due to temperature change of the evaporation portion of the system.

11. In the method of operating an absorption refrigeration system of the kind having periods of evaporation at low pressure alternating with periods of vapor expulsion at higher pressure, the improvement which comprises applying heat to expel refrigerant from solution, condensing the refrigerant, vaporizing the liquefied refrigerant, absorbing the vaporized refrigerant, and utilizing the heat generated by said absorption to stop the expulsion of refrigerant from solution.

12. In absorption refrigeration apparatus, a condenser and an absorber having common heat rejection surface, a liquid reservoir located below said absorber, an expeller, conduits for circulating liquid between said reservoir and said expeller, conduits connecting said absorber and reservoir for circulation of liquid, and means to introduce gas into one of the last-mentioned conduits.

13. In absorption refrigeration apparatus, a condenser, an absorber, common air-cooling surface for said condenser and said absorber, an evaporator located above said condenser and said absorber, a liquid reservoir located below said absorber, an expeller, conduits for circulating liquid between said reservoir and said expeller, conduits connecting said absorber and said reservoir for circulation of liquid, and means to conduct gas from the evaporator and introduce the same into one of the last-mentioned conduits.

14. In an absorption refrigeration system, means for overflow of liquid upon expulsion of an appreciable amount of refrigerant from solution, means to circulate absorption liquid due to said overflow by vaporization of the overflow liquid, heat supply means, and means responsive to temperature of the circulating means to control the heat supply means.

15. In an absorption refrigeration system, means for overflow of liquid upon expulsion of an appreciable amount of refrigerant from solution, means to vaporize overflowing liquid, means to produce circulation of liquid due to vaporized overflow liquid, heat supply means, and means to shut off supply of heat when said circulation is produced.

16. In an absorption refrigeration system, an expeller, an evaporator, means for overflow of liquid refrigerant from said evaporator, means to supply heat to said expeller, means to vaporize overflow refrigerant, means to produce circulation of absorption liquid due to vaporized overflow liquid, and means to shut off heat supply to the expeller when said circulation is produced.

17. In an absorption refrigeration system, an expeller, an evaporator, an absorption liquid storage reservoir, conduits forming a circulation circuit between said expeller and said reservoir including a heat exchanger, means to supply heat to said expeller, an evaporator, means to conduct refrigerant from said expeller and condense the same and introduce it into the evaporator, means for overflow of liquid refrigerant from said evaporator, means to vaporize overflow refrigerant, means to circulate absorption liquid other than through the aforementioned circulation circuit due to vaporized overflow refrigerant, and means to shut off heat supply to the expeller when the last-mentioned circulation is produced.

18. In a process of refrigeration, the steps of simultaneously heating and cooling absorption liquid, condensing refrigerant vapor, accumulating liquefied refrigerant, producing movement of cold absorption liquid when an appreciable amount of liquid refrigerant is accumulated, and shutting off the heat supply when said movement of cold absorption liquid is produced.

19. In a refrigeration system, means to simultaneously heat and cool absorption liquid, means to condense refrigerant vapor, means to accumulate liquefied refrigerant, means to cause movement of cold absorption liquid when an appreciable amount of refrigerant has been accumulated, and means to shut off the heat supply when said movement of cold absorption liquid is produced.

20. In a process of refrigeration involving low pressure periods of refrigerant evaporation and absorption alternating with higher pressure periods of vapor expulsion, the steps of heating, cooling and storing absorption liquid during expulsion periods, circulating cold absorption liquid just before the end of the expulsion periods, and shutting off heat supply when said circulation is produced.

21. In a process of refrigeration involving low pressure periods of refrigerant evaporation and absorption alternating with higher pressure periods of vapor expulsion, means to simultaneously heat, cool and store absorption liquid, means to circulate cold absorption liquid just before the end of the expulsion periods, and means to shut off heat supply when said circulation is produced.

22. In an absorption refrigeration system having low pressure periods of refrigerant evaporation and absorption alternating with higher pressure periods of vapor expulsion, an absorption liquid reservoir, an expeller, means to circulate liquid between said reservoir and said expeller, an absorption liquid circulation circuit connected to said reservoir including an upflow conduit, a downflow conduit, and an absorber situated above said expeller, means to introduce vapor into said upflow conduit, a condenser, and common heat rejecting surface for said absorber and said condenser.

23. In an absorption refrigeration system having low pressure periods of refrigerant evaporation and absorption alternating with higher pressure periods of vapor expulsion, an absorption liquid reservoir, an expeller, means to circulate liquid between said reservoir and said expeller, a volume variation vessel separate from said expeller and said reservoir, means to conduct liquid from said volume variation vessel to said expeller, an absorption liquid circulation circuit connected to said reservoir including an upflow conduit, a downflow conduit and an absorber situated above said expeller, and means to introduce vapor into said upflow conduit.

24. In an absorption refrigeration system having low pressure periods of refrigerant evaporation and absorption alternating with higher pressure periods of vapor expulsion, an absorption liquid reservoir, an expeller, means to circulate liquid between said reservoir and said expeller, a volume variation vessel separate from said expeller and said reservoir, means to conduct liquid from said volume variation vessel to said expeller, an absorption liquid circulation circuit connected to said reservoir including an upflow conduit, a downflow conduit and an absorber situated above said expeller, an evaporator, means to conduct vapor from the evaporator and introduce it into said upflow conduit, a condenser connected between the expeller and the evaporator, and common cooling surface for said absorber and said condenser.

25. In an absorption refrigeration system having low pressure periods of refrigerant evaporation and absorption alternating with higher pressure periods of vapor expulsion, an absorption liquid reservoir, an expeller, means to circulate liquid between said reservoir and said expeller, a volume variation vessel separate from said expeller, and said reservoir, means to conduct liquid from said volume variation vessel to said expeller, an absorption liquid circulation circuit connected to said reservoir including an upflow conduit, a downflow conduit and an absorber situated above said expeller, a vessel situated above said absorber adapted to receive excess unabsorbed vapor from the absorber, and means to introduce vapor into said upflow conduit.

26. In an absorption refrigeration system having low pressure periods of refrigerant evaporation and absorption alternating with higher pressure periods of vapor expulsion, an absorption liquid reservoir, an expeller, means to circulate liquid between said reservoir and said expeller, a volume variation vessel separate from said expeller and said reservoir, means to conduct liquid from said volume variation vessel to said expeller, an absorption liquid circulation circuit connected to said reservoir including an upflow conduit, a downflow conduit and an absorber situated above said expeller, an evaporator, means to conduct vapor from the evaporator and introduce it into said upflow conduit, a condenser connected between the expeller and the evaporator, common cooling surface for said absorber and said condenser, and a vessel situated above said absorber adapted to receive excess unabsorbed vapor from said absorber to displace liquid for regulating flow of vapor from the evaporator to the upflow conduit.

27. A refrigeration system of the kind having low pressure periods of refrigerant evaporation and absorption alternating with higher pressure periods of vapor expulsion including an expeller, an absorption liquid storage reservoir, means to circulate absorption liquid between said reservoir and said expeller including a liquid heat exchanger, a volume variation vessel separate from said reservoir and said expeller, means to conduct liquid from said volume variation vessel to said expeller, a condenser, and means to conduct vapor from said expeller over the surface of liquid in said volume variation vessel and to said condenser.

28. A refrigeration system of the kind having low pressure periods of refrigerant evaporation and absorption alternating with higher pressure periods of vapor expulsion including an expeller, an absorption liquid storage reservoir, means to circulate absorption liquid between said reservoir and said expeller including a liquid heat exchanger, a volume variation vessel separate from said reservoir and said expeller, means to conduct liquid from said volume variation vessel to said expeller, a condenser, means to conduct vapor from said expeller over the surface of liquid in said volume variation vessel and to said condenser, and means to maintain said volume variation vessel at higher temperature than said reservoir and said expeller at higher temperature than said volume variation vessel during expulsion periods.

29. In an absorption refrigeration system having low pressure periods of refrigerant evaporation and absorption alternating with higher pressure periods of vapor expulsion, and expulsion component, an evaporator, an absorption liquid storage reservoir adapted to hold the bulk of absorption liquid in cool condition during expulsion periods, means for overflow of liquid upon expulsion of an appreciable amount of refrigerant from solution, means to vaporize the overflow liquid, means to circulate absorption liquid due to the vaporization of overflow liquid, heat supply means, and means to shut off supply of heat when said circulation is produced.

30. In the process of refrigeration including alternate periods of generation and absorption of refrigerant vapor, that improvement which consists in separately maintaining a main body of absorption liquid having a cooling branch of appreciable length and a relatively small body of absorption liquid, alternately raising and lowering the temperature of said small body to intermittently generate refrigerant vapor, circulating liquid between said bodies during the generation periods, continuously maintaining said cooling branch subject to the influence of an external cooling medium, circulating liquid through said cooling branch due to vapor lift action during absorption periods, and rejecting a major portion of the heat of absorption during absorption periods from said cooling branch.

CARL GEORG MUNTERS.